(12) United States Patent
Islam et al.

(10) Patent No.: US 11,240,835 B2
(45) Date of Patent: Feb. 1, 2022

(54) SYSTEM AND METHOD FOR CO-EXISTENCE OF LOW-LATENCY AND LATENCY-TOLERANT COMMUNICATION RESOURCES

(71) Applicant: Huawei Technologies Co., Ltd., Shenzhen (CN)

(72) Inventors: Toufiqul Islam, Ottawa (CA); Yongxia Lyu, Beijing (CN); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/857,421

(22) Filed: Dec. 28, 2017

(65) Prior Publication Data

US 2018/0206267 A1 Jul. 19, 2018

Related U.S. Application Data

(60) Provisional application No. 62/447,432, filed on Jan. 17, 2017.

(51) Int. Cl.
*H04L 5/14* (2006.01)
*H04W 72/12* (2009.01)
(Continued)

(52) U.S. Cl.
CPC ....... *H04W 72/1289* (2013.01); *H04L 5/0037* (2013.01); *H04L 5/0048* (2013.01);
(Continued)

(58) Field of Classification Search
CPC ... H04L 5/0037; H04L 5/0042; H04L 5/0048; H04L 5/0064; H04L 5/14;
(Continued)

(56) References Cited

U.S. PATENT DOCUMENTS

2015/0334709 A1* 11/2015 Ji .................. H04W 72/042
370/330
2016/0270059 A1 9/2016 Chen et al.
(Continued)

FOREIGN PATENT DOCUMENTS

CN 102149208 A 8/2011
CN 103891341 A 6/2014
(Continued)

OTHER PUBLICATIONS

Intel Corporation, "NR frame structure for forward compatibility", 3GPP TSG RAN WG1 Meeting #86bis, R1-1609509, Oct. 10-14, 2016, 4 Pages, Lisbon, Portugal.
(Continued)

*Primary Examiner* — Harun Chowdhury
(74) *Attorney, Agent, or Firm* — Slater Matsil, LLP

(57) ABSTRACT

A method for scheduling a downlink transmission is provided. The method includes receiving, by a user equipment (UE), downlink control information (DCI) from a base station, the DCI indicating a location of a transmission duration within a subframe, the location of the transmission duration including a start position of the transmission duration and a length of the transmission duration, the length of the transmission duration being 2, 4, or 7 symbols. The method further includes receiving downlink data from the base station, the downlink data carried by the transmission duration at the location indicated by the DCI.

21 Claims, 9 Drawing Sheets

(51) Int. Cl.
*H04L 5/00* (2006.01)
*H04W 88/02* (2009.01)
*H04W 72/04* (2009.01)

(52) U.S. Cl.
CPC .......... *H04L 5/0053* (2013.01); *H04L 5/0091* (2013.01); *H04L 5/14* (2013.01); *H04L 5/1469* (2013.01); *H04L 5/0007* (2013.01); *H04L 5/0051* (2013.01); *H04W 72/0446* (2013.01); *H04W 88/02* (2013.01)

(58) Field of Classification Search
CPC ........... H04W 72/0406; H04W 72/042; H04W 72/0446; H04W 72/0453; H04W 72/1289
USPC .................. 370/252, 280, 329, 330
See application file for complete search history.

(56) References Cited

U.S. PATENT DOCUMENTS

| | | | |
|---|---|---|---|
| 2016/0301555 A1 | 10/2016 | Nory et al. | |
| 2017/0105206 A1* | 4/2017 | Maattanen | H04L 5/0037 |
| 2017/0251465 A1* | 8/2017 | Andersson | H04L 5/0037 |
| 2018/0035332 A1* | 2/2018 | Agiwal | H04L 5/0064 |
| 2019/0104533 A1* | 4/2019 | Kim | H04W 72/0446 |
| 2019/0297638 A1* | 9/2019 | Park | H04W 72/042 |

FOREIGN PATENT DOCUMENTS

| | | |
|---|---|---|
| CN | 104488217 A | 4/2015 |
| CN | 106231677 A | 12/2016 |
| CN | 106255213 A | 12/2016 |
| CN | 106255215 A | 12/2016 |
| JP | 2017532839 A | 11/2017 |
| KR | 20140022071 A | 2/2014 |
| RU | 2565247 C1 | 10/2015 |
| WO | 2010145177 A1 | 12/2010 |
| WO | 2014110759 A1 | 7/2014 |
| WO | 2016142006 A1 | 9/2016 |
| WO | 2016142132 A1 | 9/2016 |

OTHER PUBLICATIONS

Fujitsu, "Discussion on reference signal in mini-slot", TSG-RAN WG1 #NR AH, R1-1700661, Jan. 16-20, 2017, 4 pages, Spokane, USA.

Intel Corporation, "Downlink Multiplexing of eMBB and URLLC Transmissions", 3GPP TSG RAN WG1 NR Ad-Hoc Meeting, R1-1700374, Jan. 16-20, 2017, 12 pages, Spokane, USA.

Intel Corporation, "Uplink Multiplexing of eMBB and URLLC Transmissions", 3GPP TSG RAN WG1 NR Ad-Hoc Meeting, R1-1700377, Jan. 16-20, 2017, 8 pages, Spokane, USA.

Zte et al., "About URLLC and eMBB multiplexing in downlink", 3GPP TSG RAN WG1 AH_NR Meeting, Spokane, USA; R1-1700264, Jan. 16-20, 2017, XP051207802A, 10 pages.

Zte et al., "About mini-slot design", TSG-RAN WG1 AH-NR Meeting, Spokane, USA; R1-1700424, Jan. 16-20, 2017, XP051207960A, 6 pages.

Sequans Communications, "On dynamic resource sharing between URLLC and eMBB in DL", 3GPP TSG RAN WG1 AH_NR Meeting, Spokane, USA; R1-1700642, Jan. 16-20, 2017, XP051208167A, 6 pages.

Intel Corporation, "NR physical resource block definition", 3GPP TSG RAN WG1 Meeting #86bis, R1-1609506, Oct. 10-14, 2016, 4 Pages, Lisbon, Portugal.

* cited by examiner

SYSTEM AND METHOD FOR CO-EXISTENCE OF LOW-LATENCY AND LATENCY-TOLERANT COMMUNICATION RESOURCES

This application claims the benefit of U.S. Provisional Application No. 62/447,432 filed on Jan. 17, 2017 by Toufiqul Islam et al. and entitled "System and Method for Co-existence of Low-Latency and Latency-Tolerant Communication Resources," which is hereby incorporated herein by reference as if reproduced in its entirety.

TECHNICAL FIELD

The present invention relates generally to wireless communications, and, in particular embodiments, to a system and method for the co-existence of low-latency and latency-tolerant communication resources.

BACKGROUND

In some wireless communication systems, a user equipment (UE) wirelessly communicates with one or more base stations. A wireless communication from a UE to a base station is referred to as an uplink (UL) communication. A wireless communication from a base station to a UE is referred to as a downlink (DL) communication. Resources are required to perform uplink and downlink communications. For example, a base station may wirelessly transmit data to a UE in a downlink communication at a particular frequency for a particular duration of time. The frequency and time duration are examples of resources.

A base station allocates resources for downlink communications to the UEs served by the base station. The wireless communications may be performed by transmitting orthogonal frequency-division multiplexing (OFDM) symbols.

Some UEs served by a base station may need to receive data from the base station with lower latency than other UEs served by the base station. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to receive data with lower latency compared to the first UE. The second UE may also need to receive its data with higher reliability than the first UE. The second UE may be a UE with ultra-reliable low latency communication (URLLC) traffic, whereas the first UE may be a UE with enhanced mobile broadband (eMBB) traffic. Further, some UEs may receive several types of traffic from the base station, e.g., a UE may receive both URLLC and eMBB traffic.

UEs that are served by a base station and that require lower latency downlink communication will be referred to as "low latency UEs." The other UEs served by the base station will be referred to as a "latency tolerant UEs." Data to be transmitted from the base station to a low latency UE will be referred to as "low latency data," and data to be transmitted from the base station to a latency tolerant UE will be referred to as "latency tolerant data."

It is desired to have a base station and suitable frame structure that can accommodate the use of the same time-frequency resources by both low latency UEs and latency tolerant UEs.

SUMMARY

In accordance with an embodiment, a method for scheduling a downlink transmission is provided. In this example, the method includes receiving, by a user equipment (UE), downlink control information (DCI) from a base station, the DCI indicating a location of a transmission duration within a subframe, the location of the transmission duration including a start position of the transmission duration and a length of the transmission duration, the length of the transmission duration being 2, 4, or 7 symbols. The method further includes receiving downlink data from the base station, the downlink data carried by the transmission duration at the location indicated by the DCI.

In accordance with an embodiment, a UE is provided. In this example, the UE includes a processor and a non-transitory computer readable storage medium storing programming for execution by the processor, the programming including instructions to receive DCI from a base station, the DCI indicating a location of a transmission duration within a subframe, the location of the transmission duration including a start position of the transmission duration and a length of the transmission duration, the length of the transmission duration being 2, 4, or 7 symbols. The programming further includes instructions to receive downlink data from the base station, the downlink data carried by the transmission duration at the location indicated by the DCI.

In accordance with an embodiment, a method for scheduling a downlink transmission is provided. In this example, the method includes transmitting, by a base station, DCI to a UE, the DCI indicating a location of a transmission duration within a subframe, the location of the transmission duration including a start position of the transmission duration and a length of the transmission duration, the length of the transmission duration being 2, 4, or 7 symbols. The method further includes transmitting the downlink data to the UE, the downlink data carried by the transmission duration at the location indicated by the DCI.

In accordance with an embodiment, a base station is provided. In this example, the base station includes a processor and a non-transitory computer readable storage medium storing programming for execution by the processor, the programming including instructions to transmit DCI to a UE, the DCI indicating a location of a transmission duration within a subframe, the location of the transmission duration including a start position of the transmission duration and a length of the transmission duration, the length of the transmission duration being 2, 4, or 7 symbols. The programming further includes instructions to transmit the downlink data to the UE, the downlink data carried by the transmission duration at the location indicated by the DCI.

Optionally, in such an example, or in any of the previous examples, the DCI includes an index, the index indicating the start position of the transmission duration and the length of the transmission duration in accordance with a pre-defined mapping relationship.

Optionally, in such an example, or in any of the previous examples, the index is one of a plurality of indices from a pre-defined mapping table, the pre-defined mapping table further including a plurality of start positions of the transmission duration and a plurality of lengths of the transmission duration corresponding to the plurality of indices.

Optionally, in such an example, or in any of the previous examples, the start position of the transmission duration is indicated in terms of symbol index in the subframe and the length of the transmission duration is indicated in terms of number of symbols.

Optionally, in such an example, or in any of the previous examples, the transmission duration includes an aggregation of a plurality of transmission durations of smaller lengths.

Optionally, in such an example, or in any of the previous examples, a demodulation reference signal (DMRS) is transmitted on at least the first symbol or the second symbol of the subframe.

Optionally, in such an example, or in any of the previous examples, an additional DMRS is transmitted in the subframe.

Optionally, in such an example, or in any of the previous examples, the subframe is a time division duplex (TDD) self-contained interval.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Resources used for downlink communication may be partitioned by the base station so that a portion of the resources are reserved for the downlink transmission of low latency data. The resources that are reserved for the downlink transmission of low latency data will be referred to as "low latency resources". Low latency data may be bursty or sporadic in nature, and may be transmitted in short packets. Therefore, there may not always be low latency data at the base station that needs to be transmitted using all of the low latency resources. Another partition is used for latency tolerant traffic, which herein is referred to as "latency tolerant resources".

Embodiments relate to a system and method for the co-existence of low-latency and latency-tolerant communication resources. In particular, a base station opportunistically schedules, on latency tolerant resources, low latency data for one or more low latency UEs. When low latency data is scheduled on latency tolerant resources, control signaling is used to indicate that low latency data is scheduled on the latency tolerant resources. Scheduling low latency data on latency tolerant resources may be referred to herein as "occupying" the latency tolerant resources with low latency data. Further embodiments relate to control signaling for indicating the locations and/or formats of the punctured resources. In various embodiments, the low-latency data, traffic, and/or resources may respectively be URLLC data, traffic, and/or resources, and the latency-tolerant data, traffic, and/or resources may respectively be eMBB data, traffic, and/or resources.

The term "traffic" generally is used interchangeably with the term "data" herein, although in some instances they may be used with different scope from each other, as will be evident from the context in which the terms are used. In various embodiments of the invention, traffic may be understood as an expression of data. For example, low-latency communication traffic can be an expression of data with relatively short transmission interval, and latency-tolerant communication traffic can be an expression of data with relatively long transmission interval. In embodiments, data with subcarrier spacing of 15 kHz can be understood as data with relatively long transmission interval while data with subcarrier spacing of 30 kHz/60 kHz/120 kHz can be understood as data with relatively short transmission interval. Or, data with subcarrier spacing of 30 kHz can be understood as data with relatively long transmission interval while data with subcarrier spacing of 60 kHz/120 kHz can be understood as data with relatively short transmission interval. In embodiments, short transmission interval can also be obtained by fewer symbols than a long transmission interval for same or different subcarrier spacing.

Figure 1:
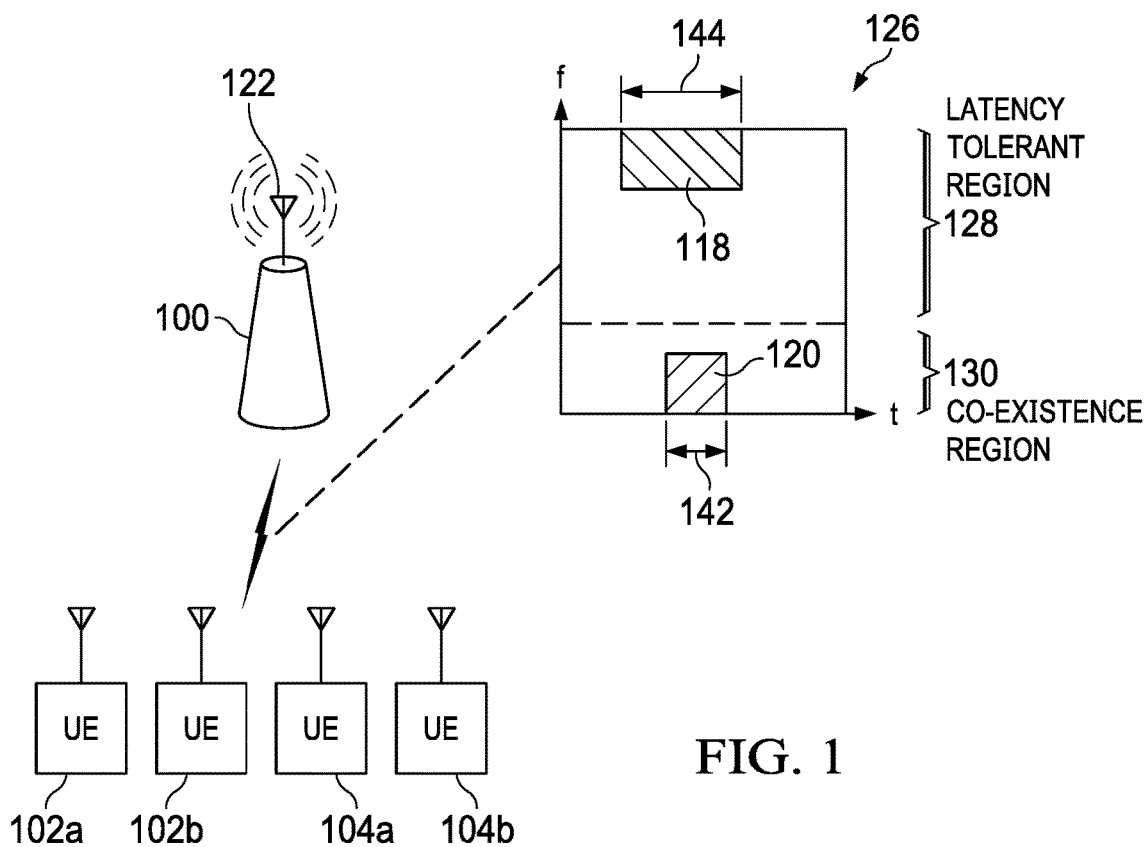
FIG. 1 is a diagram of a network, according to an embodiment.

FIG. 1 is a block diagram of a base station 100, as well as four UEs 102a, 102b, 104a, and 104b served by the base station 100, according to one embodiment. UEs 102a and 102b are low latency UEs, and UEs 104a and 104b are latency tolerant UEs. That is, UEs 102a and 102b require lower latency uplink and/or downlink communication compared to UEs 104a and 104b. For example, UEs 102a and 102b may be URLLC UEs, and UEs 104a and 104b may be eMBB UEs. Although the base station 100 only serves four UEs in FIG. 1, in actual operation the base station 100 may serve many more UEs. In examples described herein, downlink transmissions to the low latency UEs are grant-based and uplink transmissions from the low latency UEs are grant-free. However, more generally uplink and/or downlink transmissions between the base station and low latency UEs may be grant-based and/or grant-free.

The base station 100 includes one or more antennas 122 to wirelessly transmit signals carrying data for UEs 102a, 102b, 104a, and 104b, and to wirelessly receive signals carrying data from UEs 102a, 102b, 104a, and 104b. Only one antenna 122 is illustrated. The base station 100 includes other circuitry and modules, but these have been omitted for the sake of clarity. For example, the base station wo may include a processor (not shown) that executes instructions stored in a memory (not shown). When the instructions are executed, the processor causes the base station to perform the base station operations described below relating to downlink scheduling and/or allocation of resources. Alternatively, instead of a processor, the base station operations described below may be implemented using dedicated integrated circuitry, such as an application specific integrated circuit (ASIC), a graphics processing unit (GPU), or a programmed field programmable gate array (FPGA).

The word "base station" encompasses any device that wirelessly communicates with UEs using uplink and/or downlink communications. Therefore, in some implementations, the base station 100 may be called other names, such as a base transceiver station, a radio base station, a network node, an access point, a transmit node, a Node B, an evolved Node B (eNodeB), a relay station, a remote radio head, a transmit point, or a transmit and receive point. Also, in some embodiments, the components of the base station 100 are distributed. For example, some components of the base station 100 may be coupled to equipment housing the antennas 122 over a communication link (not illustrated). Although only a single base station is shown, it is contemplated that there may be more than one base station using synchronized communications to implement embodiments disclosed herein.

When a wireless transmission between the base station 100 and one or more of UEs 102a, 102b, 104a, and/or 104b occurs, the transmission uses allocated resources, for example time/frequency resources. An example of time/frequency resources is indicated at 126. Example specific resource partitions allocated to UEs are shown at 118 and 120.

A region 128 of the time/frequency resources 126 is reserved for the transmission of latency tolerant data, and this region 128 will be referred to as the latency tolerant region. Another region 130 of the time/frequency resources 126 is reserved for the transmission of both latency tolerant data and low latency data, and this region 130 will be referred to as the co-existence region. Region 128 is illustrated as a separate frequency range from region 130, although in general this need not be the case. Also, there may be another region (not shown) that is reserved just for the transmission of low latency data. Other types of regions may additionally or alternatively be present, such as regions for coexistence of low latency and latency tolerant data. For example, the time/frequency resources could be partitioned into a low latency region and a coexistence region, or into a latency tolerant region and a coexistence region. It is also contemplated that the partitioning of the time/frequency resources could be time division multiplexing (TDM) based, frequency division multiplexing (FDM) based, or in any other suitable manner, and that the partitions may change dynamically or semi-statically over time.

The resources used for low latency communications may be partitioned into slots. A slot used for low latency communication can be referred to as a "low latency slot" or a "mini slot". A mini-slot is referred to as transmission duration that contains fewer symbols than a slot. An example of a low latency slot duration is shown at 142. A low latency slot carries an encoded transport block to or from a low latency UE. It is contemplated that in some cases, an encoded transport block may span more than one slot. A low latency slot encompasses a particular number of OFDM symbols, e.g. 7 OFDM symbols or any other integer number of OFDM symbols. A low latency slot may be equal to, more than, or less than a subframe duration, depending upon the implementation. For example, if low latency slot is contemplated as a mini-slot, it would contain less number of symbols than a slot. For a slot of 7 symbols, mini-slot can contain number of symbols from 1 to 6. Other slot lengths are not precluded. A low latency slot duration may be equal to one transmission time unit (TTU), or encompass multiple TTUs, depending upon the implementation. Therefore, although "low latency slot" is used herein, it may be interchangeably called a "low latency subframe" in implementations in which a low latency slot has the same duration as a subframe. Also, "low latency slot" may be interchangeably called a "low latency TTU" in implementations in which a low latency slot has the same duration as a TTU. Also, a TTU is sometimes referred to as a transmission time interval (TTI). It is contemplated that latency tolerant traffic may optionally use the same slot duration as low latency traffic.

The resources used for latency tolerant communications may be partitioned into intervals. An interval used for latency tolerant communication will be referred to as a "latency tolerant interval". An example of a latency tolerant interval is shown at 144. A latency tolerant interval is the smallest interval of time that may be scheduled or allocated for a data transmission to/from a latency tolerant UE.

As shown in FIG. 1, a low latency slot has a time duration that is shorter than a latency tolerant interval. By transmitting low latency slots of a shorter duration, the latency of the data transmissions to/from the low latency UEs may be reduced.

Each one of UEs 102a, 102b, 104a, and 104b includes one or more antennas for wirelessly transmitting data to the base station 100 and wirelessly receiving data from the base station. Only one antenna is illustrated on each UE. Each UE would also include other circuitry and modules, but these have been omitted for the sake of clarity. For example, a UE may include a processor (not shown) that executes instructions stored in a memory (not shown). When the instructions are executed, the processor causes the UE to perform the UE operations described below relating to scheduling and/or allocating of resources. Alternatively, instead of a processor, the UE operations described below may be implemented using dedicated integrated circuitry, such as an ASIC, a GPU, or an FPGA.

Figure 2A:
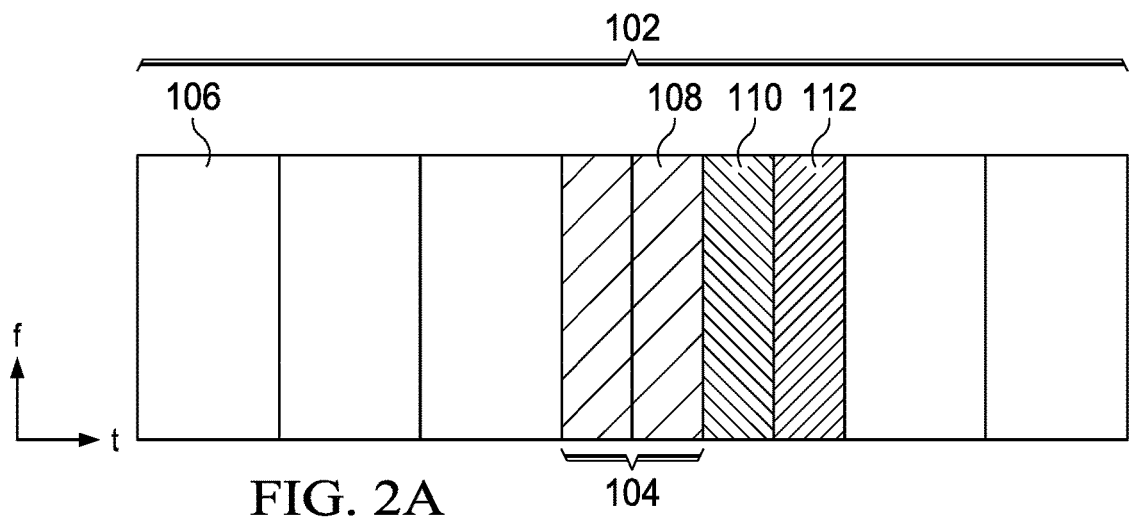
FIGS. 2A and 2B are resource diagrams showing the co-existence of low-latency and latency-tolerant communication resources, according to an embodiment.
Figure 2B:
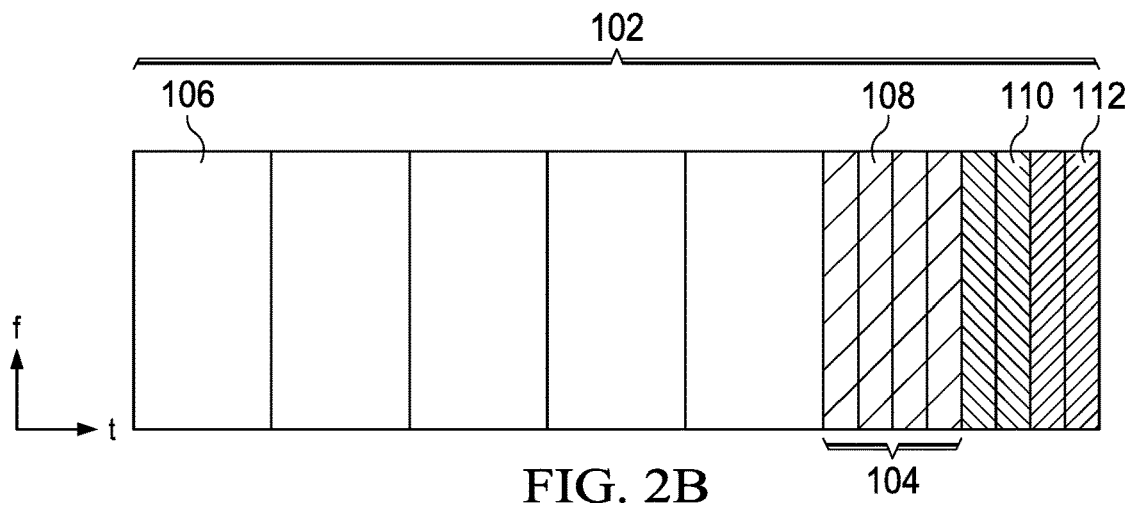

Low latency data may be bursty or sporadic in nature, and may be transmitted in short packets. A transmission to/from a low latency UE takes place during a slot, and traditionally one slot starts after another. If low latency data arrives for transmission in the middle of a low latency slot duration, and it is required to wait until the start of the next low latency slot before transmitting the low latency data, then latency is introduced. The latency occurs regardless of whether the transmission is grant-free or grant-based FIGS. 2A and 2B are resource diagrams showing the co-existence of low-latency and latency-tolerant communication resources. The diagrams in FIGS. 2A and 2B show a single time resource slot 102, which contains multiple contiguous OFDM symbols in length. For example, the resource slot 102 may be n×7 symbols in length when a normal cyclic prefix is used (where n is a positive integer), such as 7 or 14 symbols in length. Likewise, the resource slot 102 may be n×6 symbols in length when an extended cyclic prefix (eCP) is used, such as 6 or 12 symbols in length. Note that here 7 and 6 symbols are used for NCP and ECP are only as examples, and potentially it can be n×L, where L is an integer. The resource slot 102 includes smaller resource units. Each smaller resource unit includes multiple contiguous OFDM symbols. The number of OFDM symbols in a smaller resource unit is fewer that a slot. One particular type of smaller resource unit is a mini-slot 104. The mini-slot 104 is a period of time pre-reserved for low-latency communication. The mini-slot 104 may, for example, be 2 symbols in length, $2^n$ (n is a positive integer) symbols in length, or any other number of OFDM symbols such that the quantity of symbols is fewer than that of a slot. The OFDM symbols may be used for latency-tolerant communication resources 106 and low-latency communication resources 108.

Different numerologies may be used for latency-tolerant and low-latency transmissions. When pre-reserved low-latency resources are not used for low-latency transmissions, they may be use for latency-tolerant transmissions. A respective numerology may be used for each type of transmission. When the latency-tolerant transmission uses the unused pre-reserved low-latency resources, the latency-tolerant transmission may use a numerology that is the same as the numerology used on other latency-tolerant resources, or may use a numerology in accordance with the low-latency resources.

The duration of the low-latency communication resources 108 may be equal to one transmission time unit (TTU), or encompass multiple TTUs, depending on the embodiment. A TTU is the smallest unit of time that can be allocated for a particular type of transmission, for example a low latency data transmission. Also, a TTU is sometimes referred to as a transmission time interval (TTI). The low-latency communication resource 108 has a duration that is shorter than a latency tolerant UE scheduling interval.

Also shown in FIGS. 2A and 2B, the resource slot 102 has a DL/UL switching gap no, and may have a UL transmission opportunity 112 (used for, e.g., HARQ feedback, other UL control channel, or small UL data). Further details about the resource slots may be found in "Co-existence of Low Latency and Latency Tolerant Downlink Communication", which is included herewith as an appendix and is incorporated herein by reference.

The low-latency and latency-tolerant communication resources may have different subcarrier spacings. In the embodiment shown in FIG. 2A, the latency-tolerant communication resources 106 have a subcarrier spacing of 30 kHz, and the low-latency communication resources 108 have a subcarrier spacing of 60 kHz. Likewise, the DL/UL switching gap no and the UL transmission opportunity 112 have a subcarrier spacing of 60 kHz. As such, the low-latency communication resources 108 have a width that is half the width of the latency-tolerant communication resources 106. More generally, in this embodiment, the subcarrier spacing of the low-latency communication resources 108 is twice the subcarrier spacing of the latency-tolerant communication resources 106. In the embodiment shown in FIG. 2B, the latency-tolerant communication resources 106 have a subcarrier spacing of 15 kHz, and the low-latency communication resources 108 have a subcarrier spacing of 60 kHz. Likewise, the DL/UL switching gap no and the UL transmission opportunity 112 have a subcarrier spacing of 60 kHz. As such, the low-latency communication resources 108 have a width that is one quarter the width of the latency-tolerant communication resources 106. More generally, in this embodiment, the subcarrier spacing of the low-latency communication resources 108 is four times that of the subcarrier spacing of the latency-tolerant communication resources 106. In general, these numerologies are scalable (e.g. the subcarrier spacings are integer multiples of each other, or have a $2^n$ relationship with each other). Details about the numerologies of the low-latency and latency-tolerant communication resources may be found in "System and Method for Mixed Numerology Coexistence with Slot or Symbol Alignment", which is included herewith as an appendix and is incorporated herein by reference.

FIGS. 2A and 2B show embodiments where the resource slot 102 is 7 symbols in length. In these and the other disclosed embodiments where the resource slot 102 is 14 symbols in length (not shown), the embodiment shown in FIG. 2A may have an additional 5 symbols appended to the beginning and an additional 2 symbols appended to the end resource slot 102. Other arrangements are also possible to provide 14 symbols in a resource slot. Likewise, embodiment shown in FIG. 2B may have an additional 7 symbols appended to the beginning of the resource slot 102. Other arrangements are also possible to provide 14 symbols in a resource slot.

Mini-slot based URLLC traffic can be scheduled in a flexible manner. More generally, a particular time interval may have N OFDM symbols, and a low latency transmission may have a duration of k<N OFDM symbols. The low latency transmission may advantageously begin at any one of m>N/k possible OFDM symbol locations within the time interval. Alternatively, low latency transmission can start at any symbol. For an example, start position of the mini-slot can be flexibly assigned by the BS, or the start position of the mini-slot can be flexibly assigned by a predefined locations tables. Here, it is implied that start position is indicated in an assignment based on a pre-defined/pre-configured table, which lists possible or valid start positions. FIG. 3 illustrates the procedure of the communication of URLLC UE and the BS.

Step 301 the BS sends an assignment to the URLLC UE to indicate the start position. Here the start position can be assigned by the BS in a flexible style.

Different options can be considered for enabling flexible resource allocation for mini-slot during an ongoing eMBB transmission. In one embodiment, URLLC UEs expecting mini-slot may monitor control information as often as every symbol. That means control channel is blindly detected by the UE. It may be possible that this blind detection is restricted to some time locations only or some OFDM symbols within a slot. Alternatively, Control monitoring location can be pre-configured. It implies that time-frequency resources where the UE finds the control information are pre-configured. Time locations or symbols which are exempted for mini-slot scheduling can be signaled to the URLLC UE via higher signal signaling, during initial configuration, or via part of control information. Here, it is implied that if some time locations or symbols cannot be used for scheduling, information about those symbols/time locations can be conveyed to the UE by higher layer signaling or by a dynamic control information. Based on this indication, UE identifies which symbols would not be used for data communication.

In some embodiments, the BS can assign the start position based on the URLLC UE accessing the network time, the traffic load; or the BS has a predefined start position showing in table 1, and the BS can flexible to select the start position based on the UE requirement. Here, based on UE requirement, it is implied that the BS configures a pre-determined table for each UE where the table lists possible/valid start positions. As can be seen in Table 1, each index corresponds to a valid combination of start position and length/duration of transmission. Index can be represented by a bitmap comprising plurality of bits.

TABLE 1

| Index (bitmap) | Start position | the length of mini-slot (basic mini-slot granularity) |
| --- | --- | --- |
| 0 | Symbol 1 | 1 |
| 1 | Symbol 2 | 2 |
| 2 | Symbol 3 | 3 |

Figure 4A:
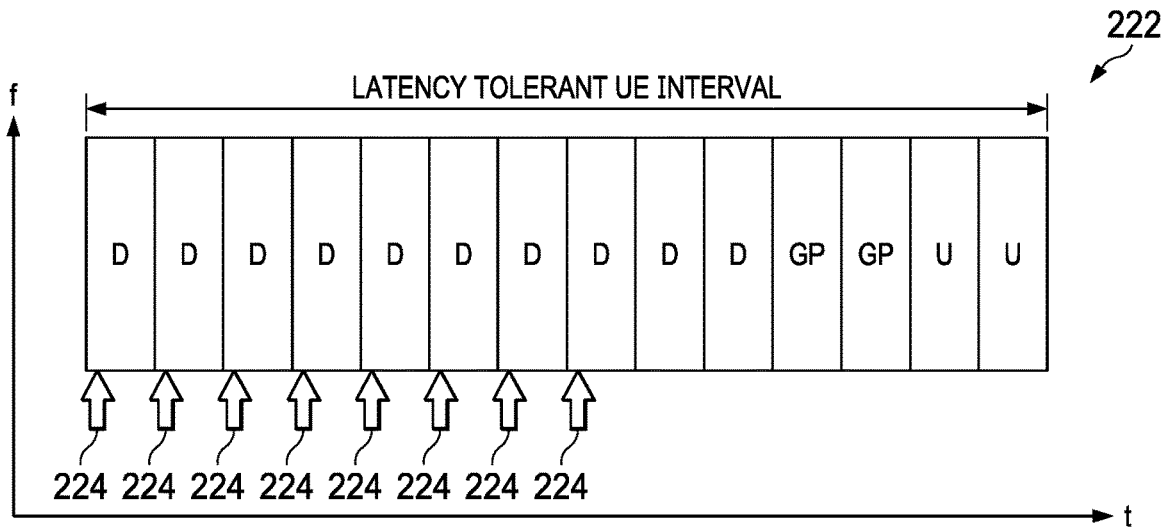
FIGS. 4A-4D show the low-latency communication resources with additional latency-tolerant communication resources, according to another embodiment.

The detailed flexible start position can be assigned in any OFDM symbols. FIG. 4A illustrates a portion of time/frequency resources 222, according to another embodiment in which there is flexibility in where low latency slots may begin. In FIG. 4A, a low latency downlink slot may begin at any one of the first eight downlink OFDM symbols, as shown at 224. The start location of a low latency slot can be flexible to try to reduce or minimize access delay. In the embodiment of FIG. 4A, the duration of a low latency slot is three OFDM symbols, which is why a low latency slot cannot start at the beginning of the last two downlink OFDM symbols. However, if the latency tolerant interval contains only downlink symbols, it is contemplated that a low latency slot may start at the beginning of any symbol. In the example in FIG. 4A, N=10, k=3, and the start of the low latency slot may begin at any one of the first m=N−k+1=8 downlink OFDM symbols.

Step 302, the BS sends an assignment the URLLC UE to indicate the length of mini-slot. The length of mini-slot is allocated based on the aggregation of mini-slots. For an example, in table 1, if the length of mini-slot is 2 symbols, the length 1 of mini-slot is 2 symbols, the length 2 of mini-slot is 4 symbols, and the length 3 of mini-slot is 6 symbols. In an alternative embodiment, the length of mini-slot can be 3 or 5 symbols.

In some embodiments, different length of mini-slots can be obtained by aggregation of basic mini-slot granularity. Basic mini-slot granularity can be any length less than slot length. It may be also possible that aggregation is formed by two different lengths. For example, BS scheduler may choose to assign URLLC traffic by aggregation two mini-slots length of two OFDM symbols. In another example, BS scheduler may choose to aggregate two mini-slots of length two and three OFDM symbols. Table 2 shows an example how control information can indicate length information for a seven symbol slot. Here, it is assumed that first symbol of slot contains control information and is not used for mini-slot scheduling. Symbols are indexed as 0, 1, 2, . . . , 5, 6. In Table, it starts from symbol index 1.

TABLE 2

| Start Position (symbol index) | Length (if basic length is one OS) and bitmap |
|---|---|
| 1 | 1 (000) |
|   | 2 (001) |
|   | 3 (010) |
|   | 4 (011) |
|   | 5 (100) |
|   | 6 (101) |
| 2 | 1 (000) |
|   | 2 (001) |
|   | 3 (010) |
|   | 4 (011) |
|   | 5 (100) |
| 3 | 1 (00) |
|   | 2 (01) |
|   | 3 (10) |
|   | 4 (11) |
| 4 | 1 (00) |
|   | 2 (01) |
|   | 3 (10) |
| 5 | 1 (0) |
|   | 2 (1) |
| 6 | 1 |

In view of Table 1, Table 2 can be represented as the following where all the combinations listed in Table 2 can be indicated based on an index. As mentioned above, in this example, start position starts from symbol 1 and length can be up to 6 symbols for the considered UE. In Tables 2-3, it is assumed that data transmission can start any symbol except the first symbol where control may be located. However, it should be understood that any other start positions in terms of symbol index in a slot and any other lengths in number of symbols can be indicated based on the considered format of the table. As shown in Table 1, each index can be represented by a bitmap comprising plurality of bits.

TABLE 3

A set of combinations of start position and lengths are indexed. Same combinations are considered as in Table 2.

| Index | Start position (symbol index) | Length (in number of symbols) |
|---|---|---|
| 0 | 1 | 1 |
| 1 | 1 | 2 |
| 2 | 1 | 3 |
| 3 | 1 | 4 |
| 4 | 1 | 5 |
| 5 | 1 | 6 |
| 6 | 2 | 1 |
| 7 | 2 | 2 |
| 8 | 2 | 3 |
| 9 | 2 | 4 |
| 10 | 2 | 5 |
| 11 | 3 | 1 |
| 12 | 3 | 2 |
| 13 | 3 | 3 |
| 14 | 3 | 4 |
| 15 | 4 | 1 |
| 16 | 4 | 2 |
| 17 | 4 | 3 |
| 18 | 5 | 1 |
| 19 | 5 | 2 |
| 20 | 6 | 1 |

In step 302, the BS assigns the different length of mini-slot by the aggregation of mini-slots, and the BS can send the assignment in DCI.

Step 301 and step 302 can be in one signaling, for an example the BS can assign the start position and the length of mini-slot in one signaling, for an example in an RRC signaling or in a DCI indicator. In some embodiment, the BS can send the index in the table 1, and UE can obtain the start position and the length of mini-slot based on the predefined table. This implies that the DCI may indicate an index in the form of bitmap in a field where the index maps to a combination of start position and length, such as any combination of start position and length shown in Tables 1-3. In another embodiment, steps 301 and 302 can be sent at different time instance. For example, length information can be conveyed less dynamically.

In some embodiments, in addition to front-loaded DMRS, the step 301 and/or step 302, slotted transmission may have additional DMRS located in other symbols. FIGS. 3C and 3D are the embodiments showing 2 examples about containing additional DMRS. The case 1 in FIG. 3C, mini-slot or aggregation of mini-slots may pre-empt the symbol containing additional DMRS; the case 2 in FIG. 3D, mini-slot aggregation avoid symbol containing DMRS. In following example, 5th symbol contains additional DMRS.

Figure 3A:
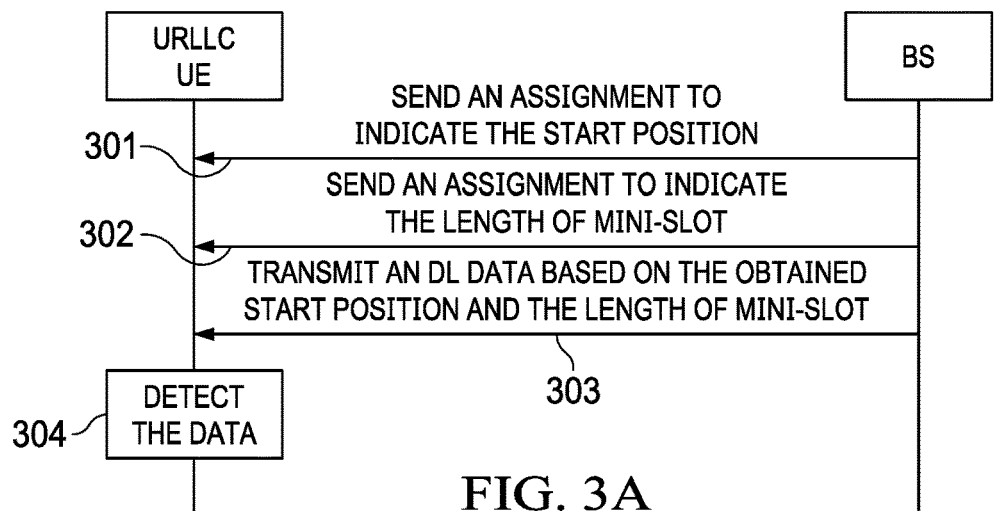
FIG. 3A is a flowchart showing the communication between the UE and BS.
Figure 3B:
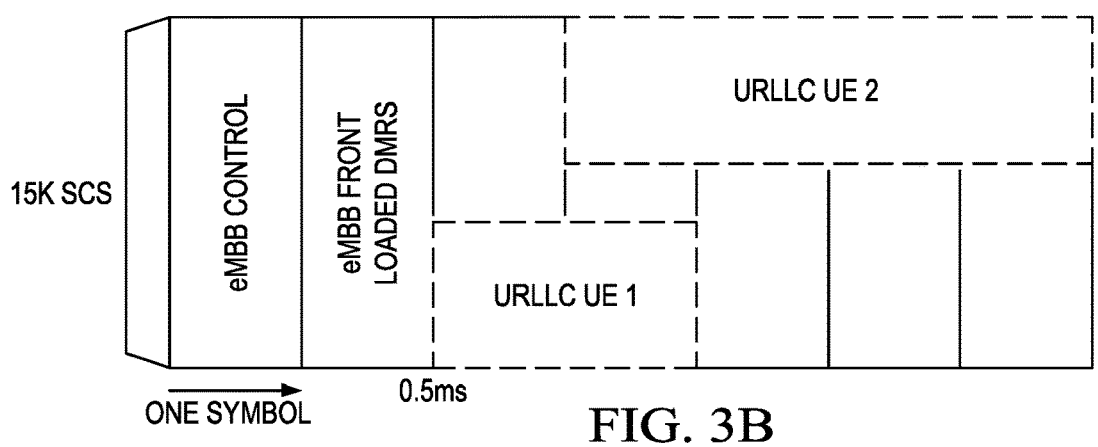
FIGS. 3B-3D are resource diagrams showing the low-latency communication resources with additional latency-tolerant communication resources, according to an embodiment.
Figure 3C:
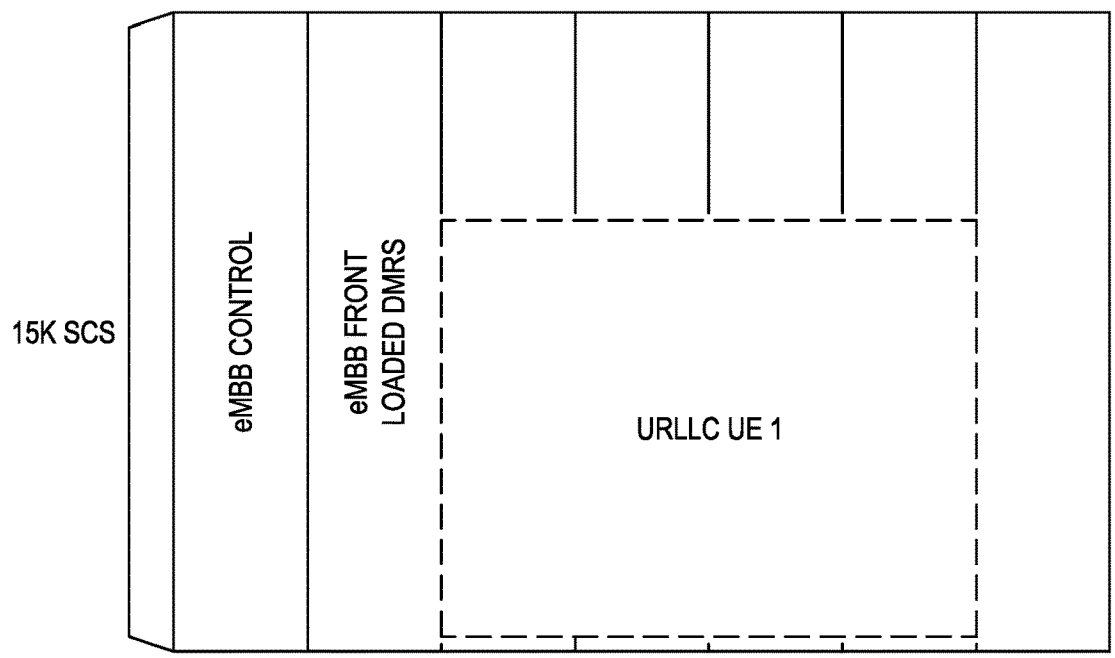
Figure 3D:
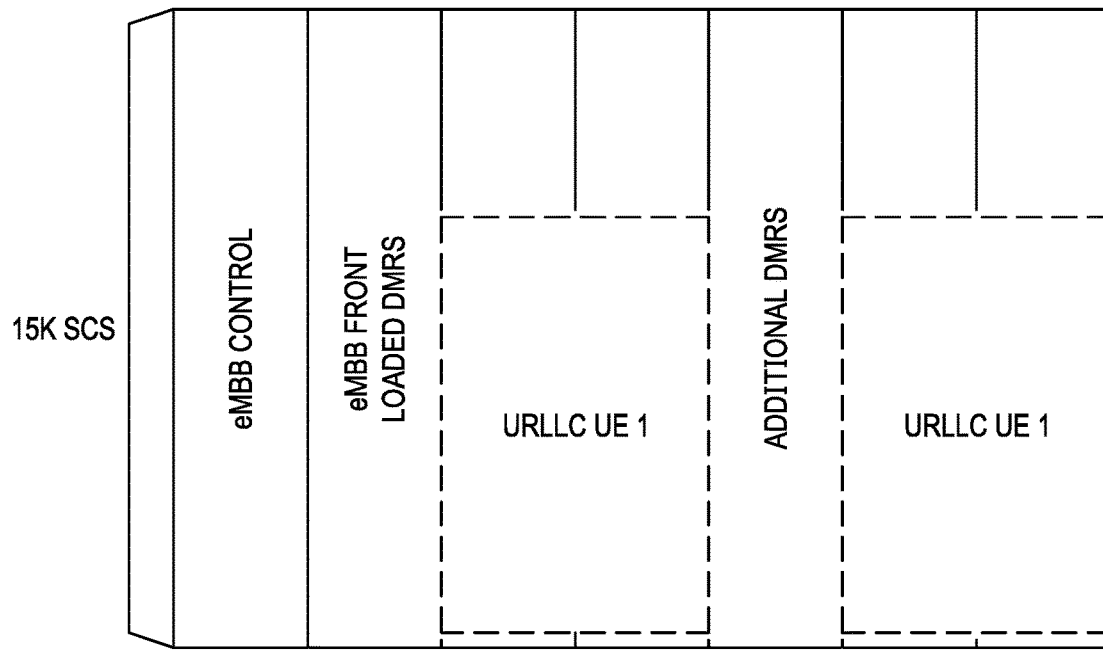

In one embodiment, FIG. 3B is the embodiment showing an example in which a low latency slot for low latency UE with different length of mini-slot. Taking mini-slot basic granularity is x symbols as an example, where 1<=x<slot length. BS or network can aggregate the different basic granularity, and different length is obtained by aggregation of basic granularity. For an example, taking an example for x=2, URLLC UE 1 assigned one mini-slot of length 2, and URLLC UE 2 assigned aggregated mini-slots of length 4.

FIG. 3B show examples of URLLC UEs scheduled for different lengths of mini-slot. Note that in this example, pre-configured locations exclude first two symbols, as those contain control and DMRS information. URLLC UE 1 is scheduled for one mini-slot whereas URLLC UE 2 is scheduled for length four y aggregation of two mini-slots.

In some embodiments, eMBB bandwidth may also contain channels containing important system information, e.g., PS, SS, PBCH, SIB, Paging. URLLC UEs who are expected to be scheduled in that BW can be indicated of these reserved resources. UE can get the information via initial configuration, the indicator can be sent via RRC signaling. The DCI of mini-slot may dynamically avoid scheduling mini-slot traffic over those REs. There are 2 options for the DCI.

Option 1: DCI will contain explicit information which symbols are assigned. For example in Case 2 in figure above, DCI will contain information of symbol index 3, 4, 6, 7. This implies DCI may indicate symbol indices explicitly instead of length, because one or more symbols within the indicated duration may not be used for data communication. This is an example when data transmission is made over non-contiguous symbols and symbol indices are indicated dynamically to avoid transmission over some symbol(s). Explicit indication of which symbols are used for transmission that facilitates dynamic and flexible data scheduling, although it comes at the expense of more overhead in DCI signaling.

Option 2: UEs are aware, by semi-static signaling or initial configuration, that it will not receive data over $5^{th}$ symbol. Hence, if DCI comes at $3^{rd}$ symbol and indicates a length of four OFDM symbols, it will read data for four symbols skipping the $5^{th}$ symbol. Here, DCI only contains length, not the exact location. Alternatively, DCI assign five symbols, with the indication that $5^{th}$ symbol of the slot is not used for decoding the mini-slot data. In this option, dynamic avoidance of some symbol(s) is not necessary and the UE finds which symbol(s) are actually used for transmission via combination of semi-static/higher layer signaling of some symbol(s) that are not used for transmission and dynamic DCI signaling which provides length of transmission.

This is to avoid the frequency band assigned to common channels, such as synchronization channel and broadcast channel. Signaling is used to indicate the location of pre-reserved frequency resources for common channels. More generally, semi-static or dynamic signaling can be indicated to the UE to notify locations of resources preserved for common channels. This signaling can also be used for notifying URLLC UE of eMBB control and DMRS location, if its data cannot pre-empt them. Here, it is implied, locations of control and DMRS of other transmissions' can be indicated to the URLLC UEs, so that they are exempted from scheduling and signaling can be conveyed semi-statically as in Option 2, or as part of DCI signaling as in Option 1.

In step 303, the BS transmits a DL data based on the start position and the length of mini-slot to the UE.

Figure 4B:
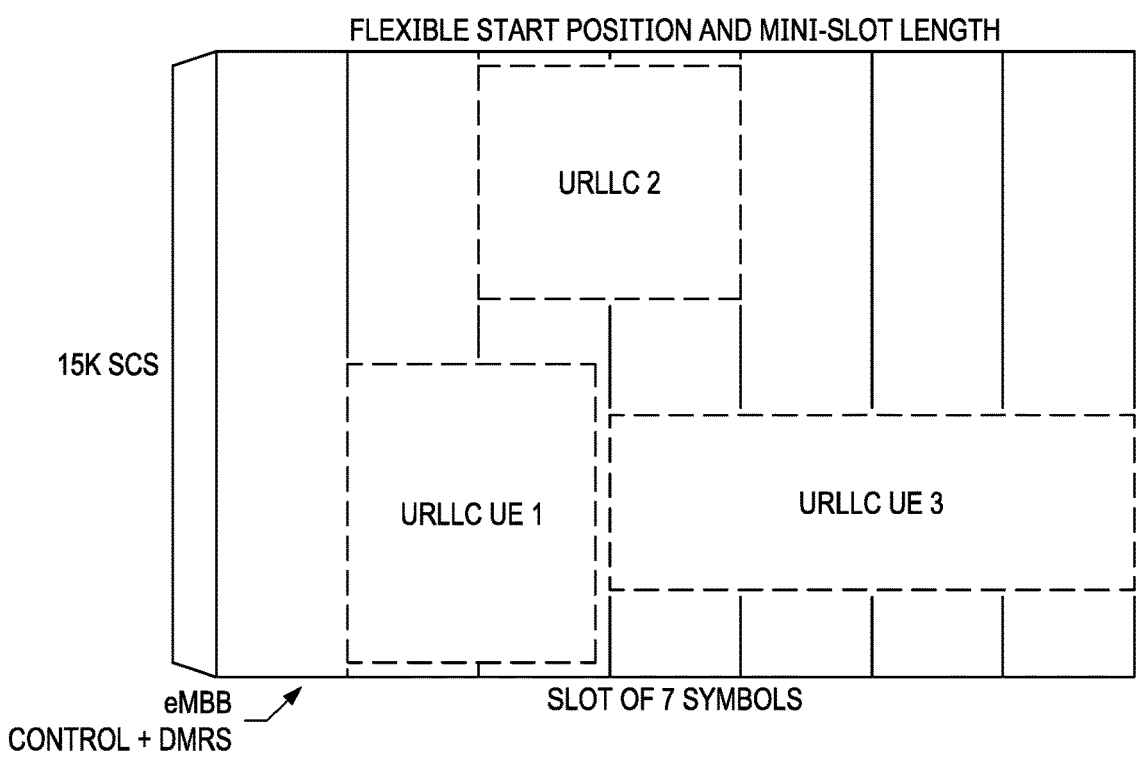

FIG. 4B is the embodiment showing an example in which a low latency slot for low latency UE is scheduled on different start point with different length of mini-slot. In the example of flexible assignment of mini-slot resources, URLLC UE1, 2, and 3 are assigned resources starting from $2^{nd}$, $3^{rd}$, and $4^{th}$ symbol, respectively.

Figure 4C:
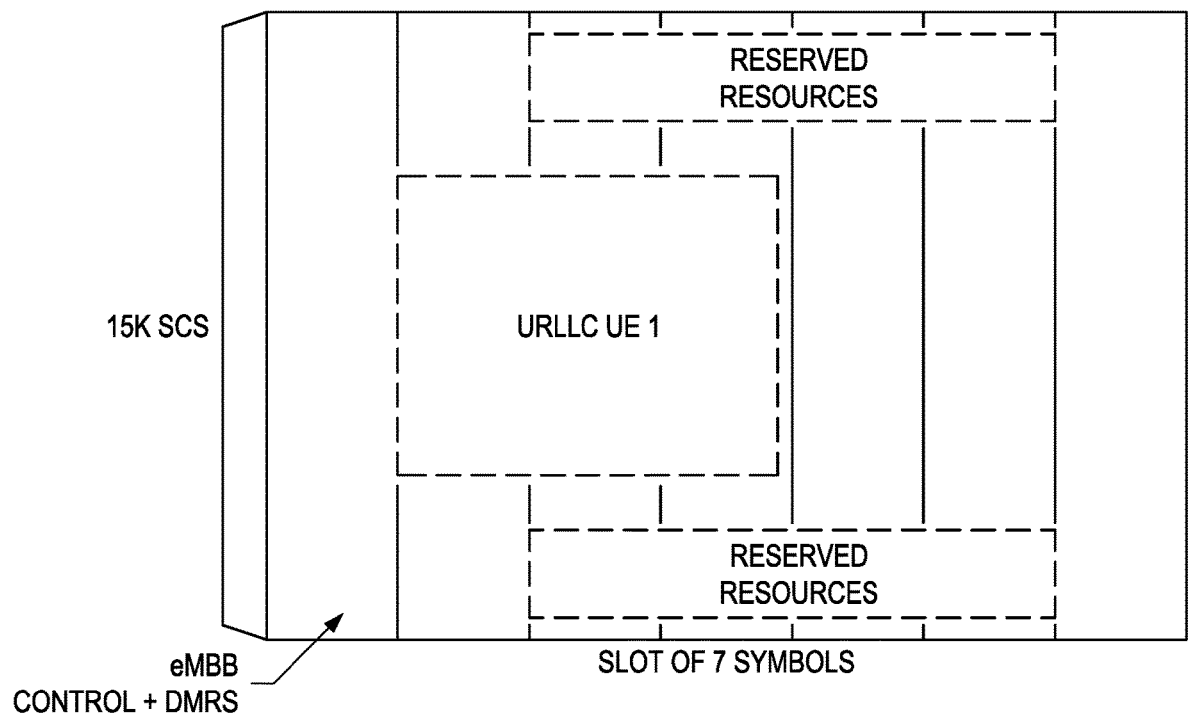

FIG. 4C is the embodiment showing an example in which a low latency slot for low latency UE is scheduled on different start point with different length of mini-slot, and the Mini-slot scheduling avoid preserved resources. For an example, mini-slot scheduling avoids some areas containing preserved resources. Preserved resources refer to the signals containing important system information, for example, information related to initial access. Preserved resources may include other resources, such as resources reserved for future proof operation.

Figure 4D:
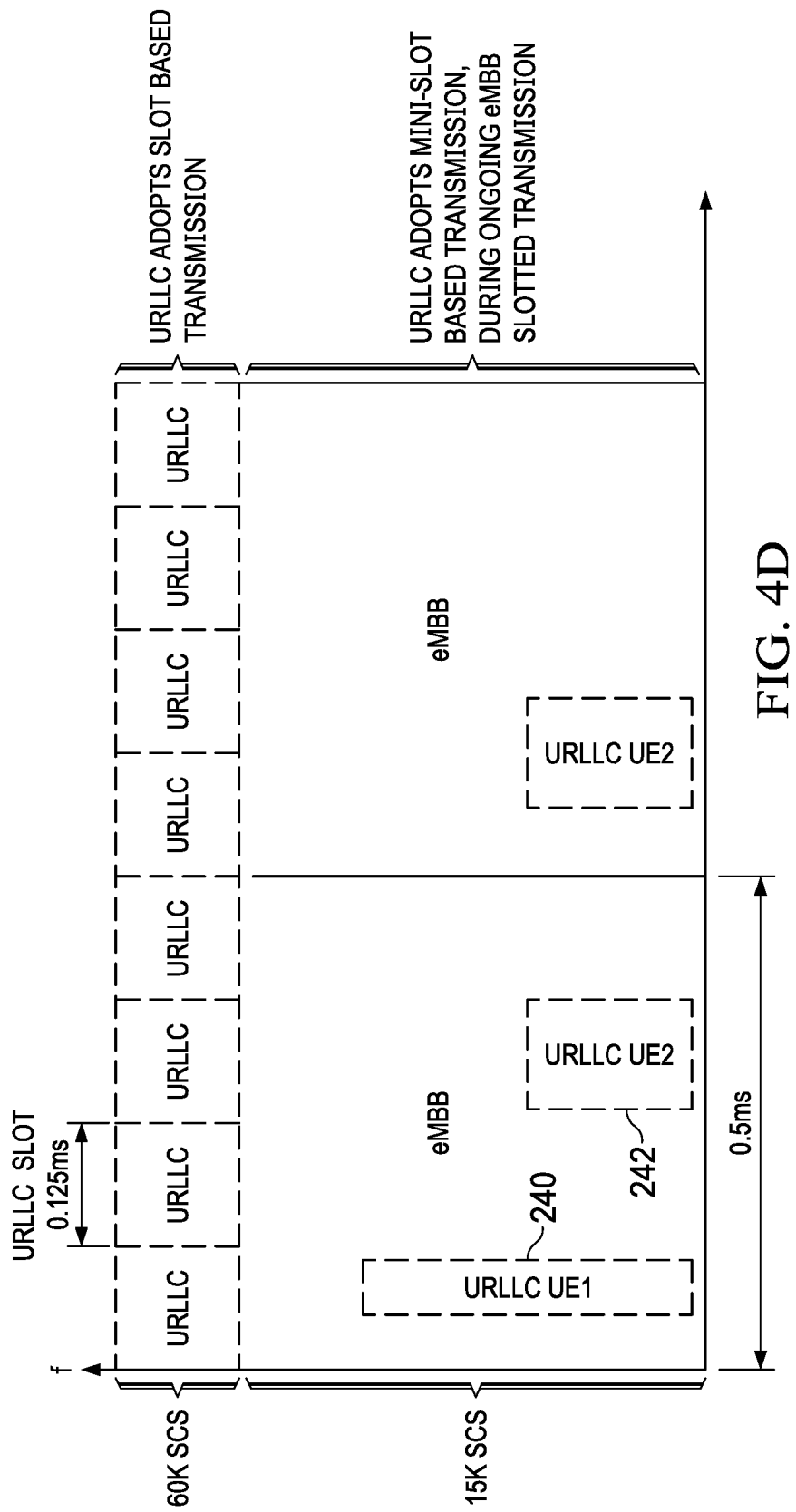

In step 303, the data can be transmitted in a combination of TDM and FDM mechanism. FIG. 4D is the embodiment showing the embodiment of TDM and FDM mechanism. In some embodiment, the URLLC and eMBB traffic can be transmitted in FDM and TDM fashion. In some embodiment, URLLC traffic can adopt both slot and mini-slot based transmissions. In some embodiment, URLLC slotted transmission can occur at larger SCS. In some embodiment, URLLC mini-slot traffic may occur during ongoing slotted eMBB transmission. In some embodiment, Mini-slots can be aggregated for URLLC transmission during ongoing eMBB transmission. In some embodiment, scheduling locations of Mini-slot or its aggregation is flexible. Example in FIG. 4D shows that how URLLC traffic can be flexibly assigned in different sub-bands associated with different numerologies.

In the FIG. 4D, shows an example how URLLC UEs are assigned mini-slot traffic in eMBB region. URLLC UE 1 is assigned mini-slot 240. The length of mini-slot 240 is two OFDM symbols. URLLC UE 2 is assigned mini-slot 242. The length of mini-slot 242 is four symbols, which can be achieved by a four symbol mini-slot or aggregation of two mini-slots where each mini-slot contains two symbols. URLLC UEs can monitor control information in the configured locations or every symbol. Control information contains the information of length of mini-slot, which can be achieved by different ways, for example, whether it is by aggregation of a basic granularity length or multiple lengths, or single mini-slot of the desired length. Here, it is implied that aggregation can be achieved by aggregating a basic length unit or aggregating different lengths such as aggregating 4 symbols and 2 symbols to obtain length of 6 symbols.

Figure 5:
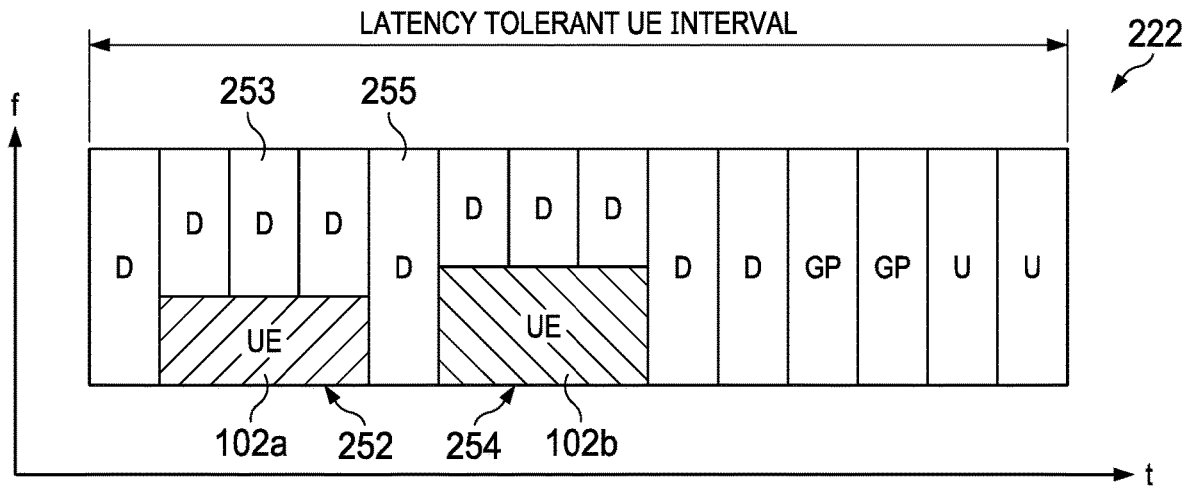
FIG. 5 illustrates time/frequency resources in more detail and show the coexistence of low latency and latency tolerant communications.

FIG. 5 is the embodiment showing an example in which a low latency slot for low latency UE 102a is scheduled on resources 252, and a low latency slot for low latency UE 102b is scheduled on resources 254. In this example, there is more low latency data to send to UE 102b compared to UE iota, which is why the amount of frequency resources allocated to UE 102b is greater than the amount of frequency resources allocated to UE iota. In FIG. 5, low latency slots cannot overlap. If the low latency data for UE 102b had arrived earlier, e.g. at the third downlink OFDM symbol 253, the low latency data for UE 102b could not have begun being transmitted until at least the fifth downlink OFDM symbol 255.

Figure 6:
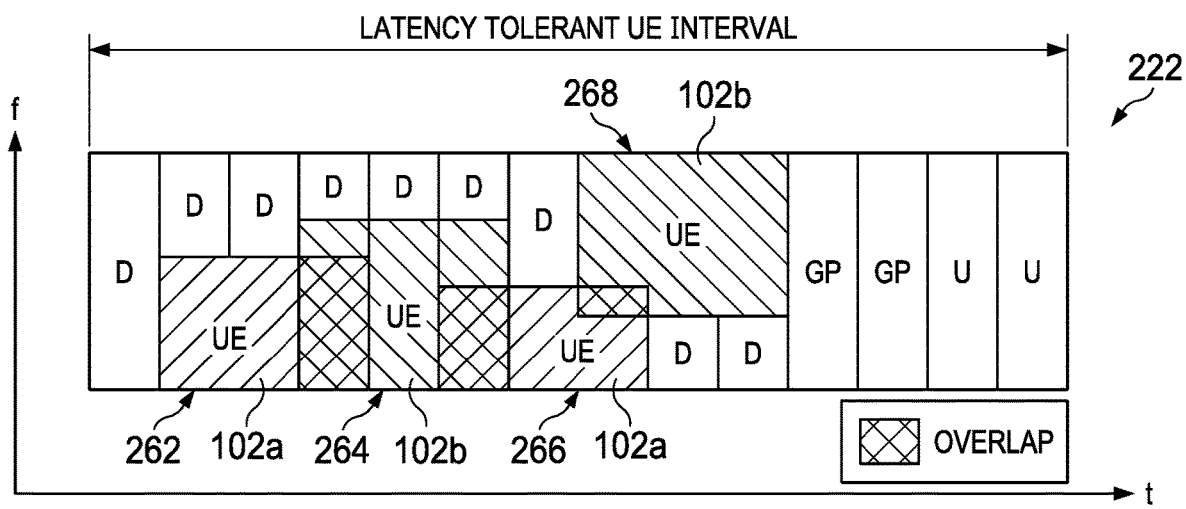
FIG. 6 illustrates time/frequency resources in more detail and show the coexistence of low latency and latency tolerant communications.

FIG. 6 is the embodiment showing an example in which a first low latency slot for low latency UE 102a is scheduled on resources 262, a first low latency slot for low latency UE 102b is scheduled on resources 264, a second low latency slot for low latency UE 102a is scheduled on resources 266, and a second low latency slot for low latency UE 102b is scheduled on resources 268. Alternatively, the low latency slots may be for four different low latency UEs. As shown in FIG. 6, low latency slots for different low latency UEs overlap in time, but may be mapped to orthogonal or non-orthogonal resources, for example in the frequency domain.

As is clear from FIGS. 5 and 6, multiple low latency slots can coexist in one latency tolerant interval, and the start location of each low latency slot can be configurable and therefore flexible to try to reduce or minimize access delay. Low latency slots for the low latency communications are assigned as low latency data arrives at the base station. A possible benefit of FIG. 5 compared to FIG. 6 is that by not overlapping low latency slots, there may potentially be less interference. Also, a low latency UE in the FIG. 5 embodiment would only need to monitor control information to determine whether there is a low latency data transmission during OFDM symbols when a low latency data transmission is permitted to begin. A low latency UE in the FIG. 6 embodiment, that is not receiving a low latency data transmission, would need to monitor control information in every one of the first eight downlink OFDM symbols to determine whether there is a low latency data transmission scheduled for it. Indicator control information can also be based on one symbol, group of symbols, based on length of mini-slot length, number of symbols CB or group of CBs of latency tolerant traffic occupies.

In the embodiments illustrated in FIGS. 3 and 4, any downlink transmissions to a low latency UE use resources that are also used to send downlink transmissions to latency tolerant UEs. Therefore, a joint transmission scheme may be used to try to overcome interference, e.g. using different code resources to transmit the latency tolerant data and the low latency data. Alternatively, whenever a low latency data transmission is scheduled during the latency tolerant interval, the latency tolerant data to be transmitted on the low latency resources may be punctured or withheld for later downlink transmission. A control signal may notify the affected latency tolerant UEs that the latency tolerant data transmission has been punctured or withheld. The control signal may be multiplexed in one or more locations during the transmission of low latency or latency tolerant traffic.

In step 304, the URLLC UE receives the data and decode the data. In an example, latency tolerant UEs receive control information at the beginning of the latency tolerant interval, regardless of whether a low latency packet is scheduled in the first slot or later. If low latency traffic comes in the first slot, the control signals for the latency tolerant and low latency traffic are multiplexed in the first few symbols of the first slot. The control information may notify the latency tolerant UE that the first slot is no longer assigned to the latency tolerant communication, but the remaining slots or parts of the remaining slots are assigned to the latency tolerant communication. In addition, if transmission of one or more bundled eMBB slots is postponed, a low overhead indicator can notify the eMBB UE of the updated scheduling.

Figure 8:
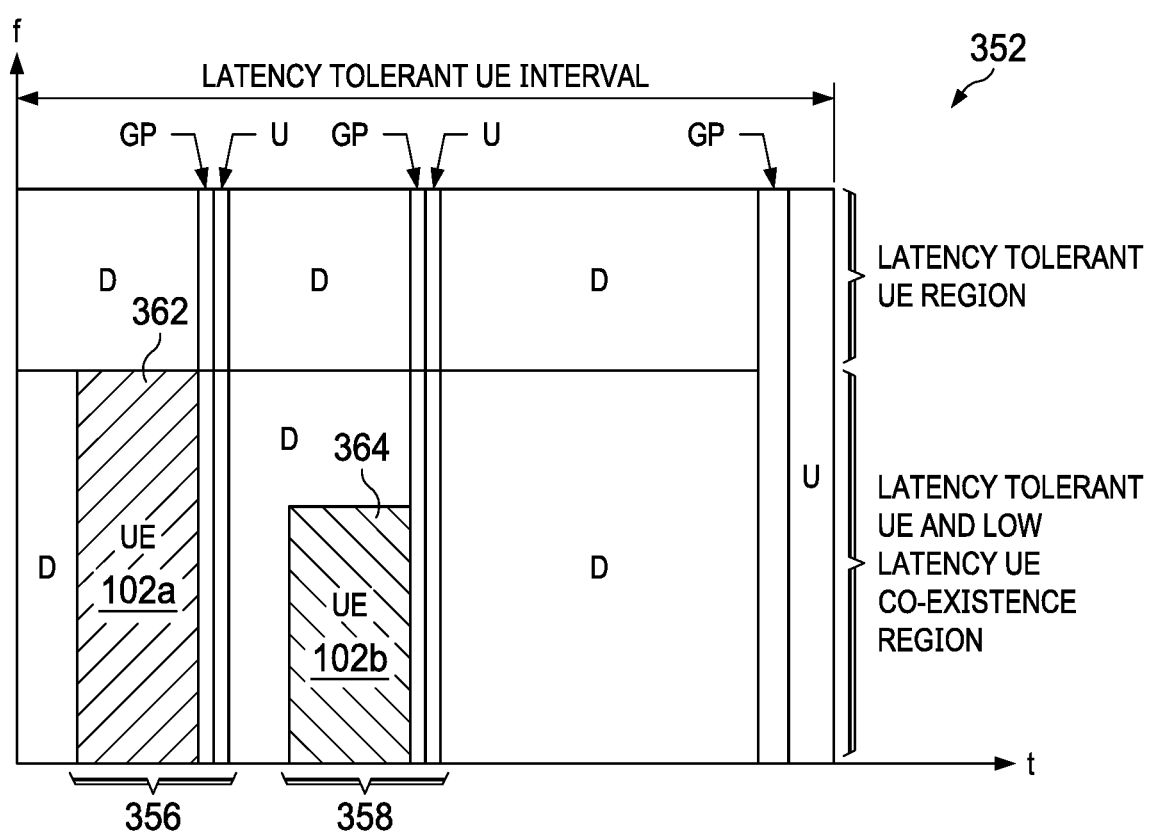
FIG. 8 illustrates time/frequency resources in more detail and show the coexistence of low latency and latency tolerant communications.

FIG. 8 illustrates a portion of time/frequency resources 352, according to another embodiment. A duration in time equal to one latency tolerant interval is illustrated. The illustrated time interval is downlink dominated. Individual OFDM symbols are not illustrated.

Low latency UEs 102a and 102b are opportunistically scheduled in the coexistence region. The slot start time of the low latency data transmissions may be flexible, e.g. as described above. However, in FIG. 8 downlink dominated low latency self-contained intervals are scheduled within the DL portion of a latency tolerant interval in the coexistence region, as shown at 356 and 358. Therefore, a latency tolerant interval must be greater than or equal to a low latency interval in this embodiment. It is contemplated that the latency tolerant region and the coexistence region may use different numerologies.

The latency tolerant data to be transmitted on the scheduled downlink low latency resources 362 and 364 may be jointly transmitted, or punctured, or withheld for later downlink transmission. A control signal may notify affected latency tolerant UEs that the latency tolerant data transmission has been punctured or withheld. During the guard period and uplink portions of the low latency self-contained intervals 356 and 358, there is no downlink transmission, not even in the latency tolerant UE region, in order to mitigate interference.

The frequency of a control indicator notifying the latency tolerant UEs of the presence of a self-contained low latency interval may be configurable. The location of the control indicator may be pre-configured. The interval between pre-configured locations of the indicator may be equal or shorter than a low latency slot duration, so that low latency transmissions can be initiated more frequently than once per slot duration. For example, if the slot duration is three symbols and a low latency transmission may be initiated at any symbol, then the frequency of the control indicator is every symbol.

In some embodiments, the low latency data transmission in low latency self-contained intervals 356 and 358 may have a different numerology compared to the latency tolerant data transmissions. For example, the latency tolerant data transmissions may use a 30 kHz subcarrier spacing, and the low latency data transmissions may use a 60 kHz subcarrier spacing. By using a 60 kHz subcarrier spacing instead of a 30 kHz subcarrier spacing, the OFDM symbols of the low latency transmissions would be shorter than the OFDM symbols of the latency tolerant transmissions. This can be achieved by using two different numerologies with symbol alignment, such that the start and end times of at least some of the symbols of one numerology align with start and end times of symbols of the other numerology. In this embodiment, a filter or other suitable means may be used to reduce the interference between the latency tolerant transmissions and the low latency transmissions of different numerologies.

In an embodiment, a supplementary transmission based on the pre-empted latency tolerant traffic can be transmitted after the impacted original transmission, based on mini-slot granularity or aggregation of mini-slot basic units or different lengths of mini-slots.

Figure 7:
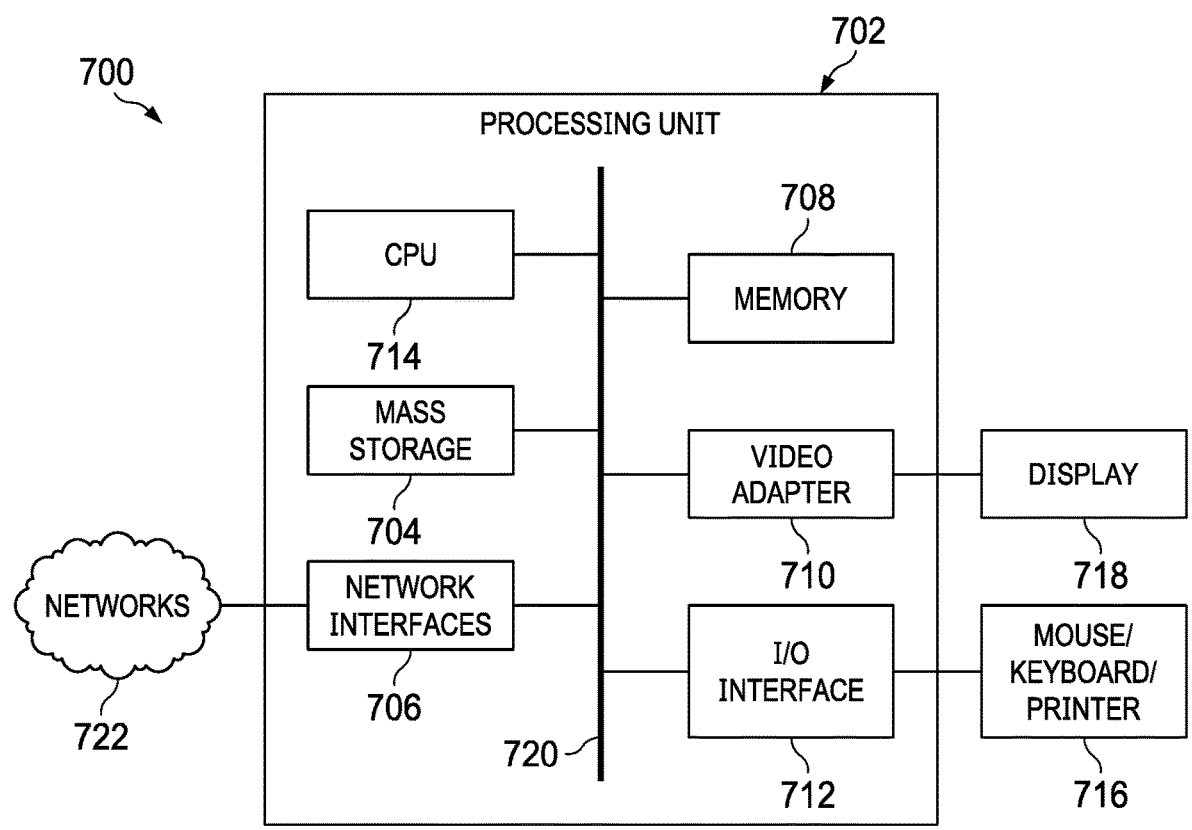
FIG. 7 is a block diagram of a transceiver.

FIG. 7 is a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s)712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an indicating unit/module, a transmitting unit/module, and/or a receiving unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

In accordance with an embodiment, there is provided a method that includes transmitting, by a base station, at least one assignment to an URLLC UE, where the at least one assignment is used for indicating a start position of mini-slot and the length of mini-slot. In this example, the method further includes transmitting data to the URLLC UE based on the assigned start position of mini-slot and the length of mini-slot, where the start position of mini-slot in a time interval is flexible assigned to the URLLC UE.

Optionally, in such an example, or in any of the previous examples, the length of mini-slot is aggregated with basic mini-slot granularity.

Optionally, in such an example, or in any of the previous examples, the basic mini-slot granularity includes at least one symbol.

Optionally, in such an example, or in any of the previous examples, transmitting at least one assignment includes transmitting one assignment to indicate the start position of mini-slot and the length of mini-slot, or transmitting a first assignment to indicate the start position of mini-slot and transmitting a second assignment to indicate the length of mini-slot.

Optionally, in such an example, or in any of the previous examples, the assignment is carried in a DCI.

Optionally, in such an example, or in any of the previous examples, transmitting the data includes transmitting a first slot of k OFDM symbols, and the method further includes transmitting a second slot of k OFDM symbols, the second slot also beginning at one of m>N/k possible OFDM symbol locations within the time interval.

Optionally, in such an example, or in any of the previous examples, the time interval having the N OFDM symbols is the downlink portion of a TDD self-contained interval, and the data of the first type and the data of the second type is downlink data.

Optionally, in such an example, or in any of the previous examples, the time interval having the N OFDM symbols is the uplink portion of a TDD self-contained interval, and the data of the first type and the data of the second type is uplink data.

Optionally, in such an example, or in any of the previous examples, the time interval having the N OFDM symbols is the downlink portion of a TDD self-contained interval, the data of a second type comprises downlink OFDM symbols and uplink OFDM symbols, and a guard period is interposed between the downlink OFDM symbols and the uplink OFDM symbols.

Optionally, in such an example, or in any of the previous examples, the transmission of the data of the second type occurs using time/frequency resources that are scheduled for use in transmitting particular data of the first type, and the method further includes delaying transmission of the particular data of the first type.

Optionally, there is provided a base station that is configured to perform the method of such an example, or of any of the previous examples.

Optionally, there is provided a system that is configured to perform the method of such an example, or of any of the previous examples.

Optionally, in such an example, or in any of the previous examples, the system includes a plurality of UEs.

In accordance with an embodiment, a method for scheduling downlink data transmission is provided. In this example, the method includes receiving, by a first UE, DCI from a base station, the DCI including an index, the index mapped to a location of a transmission duration within a subframe in accordance with a pre-determined table, the transmission duration configured to carry the downlink data. The method further includes receiving the downlink data from the base station, the downlink data carried by the transmission duration at the location indicated by the index.

In accordance with an embodiment, there is provided a UE that includes a processor and a non-transitory computer readable storage medium storing programming for execution by the processor. In this example, the programming includes instructions to receive DCI from a base station, the DCI including an index, the index mapped to a location of a transmission duration within a subframe in accordance with a pre-determined table, the transmission duration configured to carry the downlink data. The programming further includes instructions to receive the downlink data from the base station, the downlink data carried by the transmission duration at the location indicated by the index.

In accordance with an embodiment, a method for scheduling downlink data transmission is provided. In this example, the method includes transmitting, by a base station, DCI to a UE, the DCI including an index, the index mapped to a location of a transmission duration within a subframe in accordance with a pre-determined table, the transmission duration configured to carry the downlink data. The method further includes transmitting the downlink data to the UE, the downlink data carried by the transmission duration at the location indicated by the index.

In accordance with an embodiment, there is provided a base station that includes a processor and a non-transitory computer readable storage medium storing programming for execution by the processor. In this example, the programming includes instructions to transmit DCI to a UE, the DCI including an index, the index mapped to a location of a transmission duration within a subframe in accordance with a pre-determined table, the transmission duration configured to carry the downlink data. The programming further includes instructions to transmit the downlink data to the UE, the downlink data carried by the transmission duration at the location indicated by the index.

Optionally, in such an example, or in any of the previous examples, the location of the transmission duration includes a start position of the transmission duration and a length of the transmission duration.

Optionally, in such an example, or in any of the previous examples, the pre-determined table includes a plurality of indices, each of the plurality of indices mapped to a combination of a start position and a length.

Optionally, in such an example, or in any of the previous examples, the start position is indicated in terms of symbol index in the subframe and the length is indicated as number of symbols.

Optionally, in such an example, or in any of the previous examples, the pre-determined table is configured based on requirement of the first UE.

Optionally, in such an example, or in any of the previous examples, the method further includes receiving configuration indicating a pre-reserved resource within the transmission duration, and receiving the downlink data from the base station, the downlink data carried by the transmission duration excluding the pre-reserved resource.

Optionally, in such an example, or in any of the previous examples, the configuration indicating the pre-reserved resources is carried by a higher layer signaling message.

Optionally, in such an example, or in any of the previous examples, the transmission duration includes an aggregation of a plurality of transmission durations of smaller lengths.

Optionally, in such an example, or in any of the previous examples, the downlink data is received over OFDM symbols in the subframe.

Optionally, in such an example, or in any of the previous examples, the downlink data is URLLC data.

Optionally, in such an example, or in any of the previous examples, the pre-reserved resource carries at least one of a synchronization sequence, system information, and paging information.

Optionally, in such an example, or in any of the previous examples, the length of the transmission duration is 2, 4, or 7 symbols.

Optionally, in such an example, or in any of the previous examples, the method further includes receiving, by a second UE, latency tolerant data from the base station, the latency tolerant data carried by the subframe.

Optionally, in such an example, or in any of the previous examples, the latency tolerant data is eMBB data.

Optionally, in such an example, or in any of the previous examples, the URLLC data is received using a first numerology and the latency tolerant data is received using a second numerology.

Optionally, in such an example, or in any of the previous examples, the subframe comprises eMBB control information, an eMBB front loaded DMRS, and an additional DMRS.

Optionally, in such an example, or in any of the previous examples, the transmission duration carrying the URLLC data pre-empts eMBB transmission on the symbols containing additional DMRS.

Optionally, in such an example, or in any of the previous examples, the subframe is a TDD subframe, the TDD subframe comprising a downlink portion, an uplink portion, and a guard period, the guard period located between the downlink portion and the uplink portion.

What is claimed is:

1. A method comprising:
    receiving, by an apparatus from a base station, higher layer signaling, the higher layer signaling indicating location information of at least one pre-emption symbol within a slot, the at least one pre-emption symbol indicated in the higher layer signaling being excluded from a downlink data transmission;
    after the receiving the higher layer signaling indicating the location information, receiving, by the apparatus, downlink control information (DCI) from the base station, wherein the DCI schedules resources for the downlink data transmission within the slot, wherein the resources scheduled for the downlink data transmission include a start position and a length, wherein the at least one pre-emption symbol is located within the resources scheduled for the downlink data transmission by the DCI, wherein the start position of the resources is in terms of a starting symbol in the slot, and wherein the length of the resources is in terms of a number of allocated symbols; and
    receiving, by the apparatus, from the base station, the downlink data transmission in accordance with a combination of the resources scheduled for the downlink data transmission by the DCI and the at least one pre-emption symbol indicated by the higher layer signaling.

2. The method of claim 1, wherein the DCI comprises an index, the index indicating the start position and the length in accordance with a pre-defined mapping relationship.

3. The method of claim 2, wherein the index is one of a plurality of indices from a pre-defined mapping table, the pre-defined mapping table further comprising a plurality of start positions and a plurality of lengths corresponding to the plurality of indices.

4. The method of claim 1, wherein the downlink data transmission comprises an aggregation of a plurality of transmissions of smaller lengths.

5. The method of claim 1, wherein a demodulation reference signal (DMRS) is transmitted on at least a first symbol or a second symbol of the slot.

6. The method of claim 5, wherein an additional DMRS is transmitted in the slot.

7. The method of claim 1, wherein the slot is a time division duplex (TDD) self-contained interval.

8. The method of claim 1, the at least one pre-emption symbol pre-empted for another data transmission.

9. The method of claim 1, wherein the at least one pre-emption symbol starts after a first symbol of the slot.

10. An apparatus comprising:
    at least one processor; and
    a non-transitory computer readable storage medium storing programming for execution by the at least one processor, the programming including instructions to:

receive, from a base station, higher layer signaling, the higher layer signaling indicating location information of at least one pre-emption symbol within a slot, the at least one pre-emption symbol indicated in the higher layer signaling being excluded from a downlink data transmission;

after receiving the higher layer signaling indicating the location information, receive downlink control information (DCI) from the base station, wherein the DCI schedules resources for the downlink data transmission within the slot, wherein the resources scheduled for the downlink data transmission include a start position and a length, wherein the at least one pre-emption symbol is located within the resources scheduled for the downlink data transmission by the DCI, wherein the start position of the resources is in terms of a starting symbol in the slot, and wherein the length of the resources is in terms of a number of allocated symbols; and receive, from the base station, the downlink data transmission in accordance with a combination of the resources scheduled for the downlink data transmission by the DCI and the at least one pre-emption symbol indicated by the higher layer signaling.

11. The apparatus of claim 10, wherein the DCI comprises an index, the index indicating the start position and the length in accordance with a pre-defined mapping relationship.

12. The apparatus of claim 11, wherein the index is one of a plurality of indices from a pre-defined mapping table, the pre-defined mapping table further comprising a plurality of start positions and a plurality of lengths corresponding to the plurality of indices.

13. The apparatus of claim 10, wherein the downlink data transmission comprises an aggregation of a plurality of transmissions of smaller lengths.

14. A method comprising:
transmitting, by a base station to a user equipment (UE), higher layer signaling, the higher layer signaling indicating location information of at least one pre-emption symbol within a slot, the at least one pre-emption symbol indicated in the higher layer signaling being excluded from a downlink data transmission;

after the transmitting the higher layer signaling indicating the location information, transmitting, by the base station, downlink control information (DCI) to the UE, wherein the DCI schedules resources for the downlink data transmission within the slot, wherein the resources scheduled for the downlink data transmission include a start position and a length, wherein the at least one pre-emption symbol is located within the resources scheduled for the downlink data transmission by the DCI, wherein the start position of the resources is in terms of a starting symbol in the slot, and wherein the length of the resources is in terms of a number of allocated symbols; and transmitting, by the base station, to the UE, the downlink data transmission in accordance with a combination of the resources scheduled for the downlink data transmission by the DCI and the at least one pre-emption symbol indicated by the higher layer signaling.

15. The method of claim 14, wherein the DCI comprises an index, the index indicating the start position and the length in accordance with a pre-defined mapping relationship.

16. The method of claim 15, wherein the index is one of a plurality of indices from a pre-defined mapping table, the pre-defined mapping table further comprising a plurality of start positions and a plurality of lengths corresponding to the plurality of indices.

17. The method of claim 14, wherein the downlink data transmission comprises an aggregation of a plurality of transmissions of smaller lengths.

18. A base station comprising:
at least one processor; and
a non-transitory computer readable storage medium storing programming for execution by the at least one processor, the programming including instructions to:
transmit, to a user equipment (UE), higher layer signaling, the higher layer signaling indicating location information of at least one pre-emption symbol within a slot, the at least one pre-emption symbol indicated in the higher layer signaling being excluded from downlink transmission;

after transmitting the higher layer signaling indicating the location information, transmit downlink control information (DCI) to the UE, wherein the DCI schedules resources for a downlink data transmission within the slot, wherein the resources scheduled for the downlink data transmission include a start position and a length, wherein the at least one pre-emption symbol is located within the resources scheduled for the downlink data transmission by the DCI, wherein the start position of the resources is in terms of a starting symbol in the slot, and wherein the length of the resources is in terms of a number of allocated symbols; and transmit to the UE, a downlink transmission in accordance with a combination of the resources scheduled for the downlink data transmission by the DCI and the at least one pre-emption symbol indicated by the higher layer signaling.

19. The base station of claim 18, wherein the DCI comprises an index, the index indicating the start position and the length in accordance with a pre-defined mapping relationship.

20. The base station of claim 19, wherein the index is one of a plurality of indices from a pre-defined mapping table, the pre-defined mapping table further comprising a plurality of start positions and a plurality of lengths corresponding to the plurality of indices.

21. The base station of claim 18, wherein the data downlink transmission comprises an aggregation of a plurality of transmissions of smaller lengths.

* * * * *